(12) United States Patent
Jang

(10) Patent No.: US 9,239,654 B2
(45) Date of Patent: Jan. 19, 2016

(54) TOUCH SCREEN PANEL

(75) Inventor: Hyoung-Wook Jang, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 85 days.

(21) Appl. No.: 13/584,879

(22) Filed: Aug. 14, 2012

(65) Prior Publication Data

US 2013/0278513 A1 Oct. 24, 2013

(30) Foreign Application Priority Data

Apr. 19, 2012 (KR) .................. 10-2012-0040969

(51) Int. Cl.
*G06F 3/041* (2006.01)
*G06F 3/044* (2006.01)

(52) U.S. Cl.
CPC ...... *G06F 3/044* (2013.01); *G06F 2203/04112* (2013.01)

(58) Field of Classification Search
CPC ............ G06F 2203/04111; G06F 2203/04112; G06F 3/044; G06F 3/041; G06F 3/048
USPC ................. 345/156–158, 173–179; 178/18.01–18.09; 463/37–38
See application file for complete search history.

(56) References Cited

U.S. PATENT DOCUMENTS

| | | | |
|---|---|---|---|
| 7,948,477 B2 | 5/2011 | Hotelling | |
| 2009/0322704 A1* | 12/2009 | Anno | 345/174 |
| 2010/0013745 A1* | 1/2010 | Kim et al. | 345/76 |
| 2010/0110023 A1* | 5/2010 | Chien et al. | 345/173 |
| 2010/0123670 A1* | 5/2010 | Philipp | 345/173 |
| 2010/0171718 A1 | 7/2010 | Denda | |
| 2010/0214247 A1* | 8/2010 | Tang et al. | 345/173 |
| 2011/0018838 A1* | 1/2011 | Lee | 345/174 |
| 2011/0102370 A1* | 5/2011 | Kono et al. | 345/174 |
| 2011/0148781 A1* | 6/2011 | Chen et al. | 345/173 |
| 2011/0169769 A1 | 7/2011 | Takahashi | |
| 2011/0210935 A1* | 9/2011 | Chuang | 345/174 |
| 2011/0227838 A1 | 9/2011 | Jeon et al. | |
| 2011/0279401 A1 | 11/2011 | Hong et al. | |
| 2011/0290631 A1 | 12/2011 | Kuriki | |
| 2012/0062250 A1* | 3/2012 | Kuo | 324/686 |
| 2012/0105337 A1 | 5/2012 | Jun et al. | |
| 2013/0219679 A1* | 8/2013 | Cok | 29/25.41 |

FOREIGN PATENT DOCUMENTS

| | | |
|---|---|---|
| CN | 101635304 A | 1/2010 |
| CN | 101776967 A | 7/2010 |
| EP | 2 330 488 A1 | 6/2011 |
| KR | 10-2010-0010019 A | 1/2010 |
| KR | 10-2011-0051208 A | 5/2011 |
| KR | 10-2011-0082296 | 7/2011 |

(Continued)

OTHER PUBLICATIONS

Chinese Office Action dated Sep. 6, 2015 in Corresponding Chinese Patent Application No. 201310038913.8.

*Primary Examiner* — Md Saiful A Siddiqui
(74) *Attorney, Agent, or Firm* — Lee & Morse, P.C.

(57) ABSTRACT

A touch screen panel includes a plurality of pixels on a substrate, a sealing thin film on the substrate, and a plurality of sensing electrodes on the sealing thin film, each of the sensing electrodes having a mesh structure, the mesh structures of the sensing electrodes and the pixels overlapping different portions of the substrate.

12 Claims, 7 Drawing Sheets

(56) References Cited

FOREIGN PATENT DOCUMENTS

| | | |
|---|---|---|
| KR | 10-2011-0089423 A | 8/2011 |
| KR | 10-2011-0104227 A | 9/2011 |
| KR | 10-2011-0125970 A | 11/2011 |
| KR | 10-2011-0127429 A | 11/2011 |
| KR | 10-2011-0130343 A | 12/2011 |
| KR | 10-2012-0045288 A | 5/2012 |
| WO | WO 2011/108869 | * 9/2011 |

* cited by examiner

TOUCH SCREEN PANEL

CROSS-REFERENCE TO RELATED APPLICATION

This application claims priority under 35 USC §119 to and the benefit of Korean Patent Application No. 10-2012-0040969, filed on Apr. 19, 2012, in the Korean Intellectual Property Office, the entire content of which is incorporated herein by reference.

BACKGROUND

1. Field

Example embodiments relate to a touch screen panel, and more particularly, to a touch screen panel of which image quality is not damaged even in the case of using a metal material capable of being sintered at a low temperature.

2. Description of the Related Art

A touch screen panel is an input device capable of inputting a predetermined command by allowing a user to touch a screen with his/her hand or with an object. Since the touch screen panel, as described above, does not require a separate input device, e.g., a keyboard, a mouse, or the like, its use is increasing, e.g., in mobile devices.

The touch screen panel may be implemented as, e.g., a resistive type, an optical sensing type, a capacitive type, and the like. For example, the capacitive type touch screen panel may include a transparent electrode, e.g., made of an indium tin oxide (ITO) material, to detect a point at which capacitance is changed according to a contact by a user's hand or object, thereby recognizing a contact position.

For example, the transparent electrode may be formed by a photolithography process. In another example, the transparent electrode may be formed by a printing process, followed by sintering a transparent electrode material in a liquid form. However, since these processes are performed at a high temperature, pixels may be deteriorated and damaged.

SUMMARY

Example embodiments provide a touch screen panel with a sensing electrode made of metal capable of being sintered at a low temperature, thereby preventing damage to pixels.

Example embodiments also provide a touch screen panel with a sensing electrode having a mesh shape, thereby improving visibility.

According to an exemplary embodiment, there is provided a touch screen panel including a plurality of pixels on a substrate, a sealing thin film on the substrate, and a plurality of sensing electrodes on the sealing thin film, each of the sensing electrodes having a mesh structure, the mesh structures of the sensing electrodes and the pixels overlapping different portions of the substrate.

The sensing electrodes may include an opaque metal.

The mesh structure of each sensing electrode may include a plurality of intertwined metal lines defining a plurality of openings, each opening exposing at least one pixel.

Each of the metal lines may have a width that equals an inter-pixel distance or less.

Each opening may expose three pixels corresponding to a red pixel, a green pixel, and blue pixel.

The sensing electrodes may include first sensing electrodes extended in a first direction, and second sensing electrodes extended in a second direction intersecting with the first direction.

The first sensing electrode and the second electrode may be formed directly on the sealing thin film, an insulating film being positioned between the first sensing electrodes and the second electrodes at least in an intersection region between the first and second sensing electrodes.

The first and second sensing electrodes may be on different layers, the first sensing electrodes being on the sealing thin film, and an insulating layer being positioned between the first sensing electrodes and the second sensing electrodes.

The first sensing electrodes may include a plurality of first sensing cells arranged in the first direction, and first connection patterns connecting the first sensing cells to each other, and the second sensing electrodes include a plurality of second sensing cells arranged in the second direction, and second connection patterns connecting the second sensing cells to each other.

The first sensing cells and the second sensing cells may have a diamond shape.

The first sensing cells and the second sensing cells may have a mesh structure with a plurality of openings.

The first sensing electrode may further include a first auxiliary cell connected to the first connection pattern, and the second sensing electrode may further include a second auxiliary cell connected to the second connection pattern.

The first auxiliary cell may be on a central portion of the first connection pattern, and the second auxiliary cell may be on a central portion of the second connection pattern.

The first auxiliary cell may extend toward a second sensing cell adjacent thereto, and the second auxiliary cell may extend toward a first sensing cell adjacent thereto.

Each of the first auxiliary cell and the second auxiliary may have a mesh structure with at least one opening.

The opening in each of the first auxiliary cell and the second auxiliary cell may expose at least one pixel.

The first connection pattern and the second connection pattern may intersect with each other, an insulating film being interposed therebetween.

The first sensing electrode and the second electrode may have a stripe shape, each of the first and second sensing electrodes having a mesh structure with a plurality of openings.

The touch screen panel may further include a dummy electrode between the first sensing electrode and the second electrode.

The dummy electrode may be electrically floated.

The dummy electrode may include an opaque metal.

The dummy electrode may have a mesh structure with at least one opening.

The at least one opening may expose at least one pixel.

The dummy electrode may be positioned on the sealing thin film or on the insulating layer.

The touch screen panel may further include a first position detecting line connected to one end of the first sensing electrode, a second position detecting line connected to one end of the second sensing electrode.

The first position detecting line and the second position detecting line may include a same material as the first and second sensing electrodes, respectively.

The sensing electrodes may on a surface of the sealing thin film facing away from the substrate.

BRIEF DESCRIPTION OF THE DRAWINGS

Features will become apparent to those of ordinary skill in the art by describing in detail exemplary embodiments with reference to the attached drawings, in which.

DETAILED DESCRIPTION OF THE INVENTION

Figure 1:
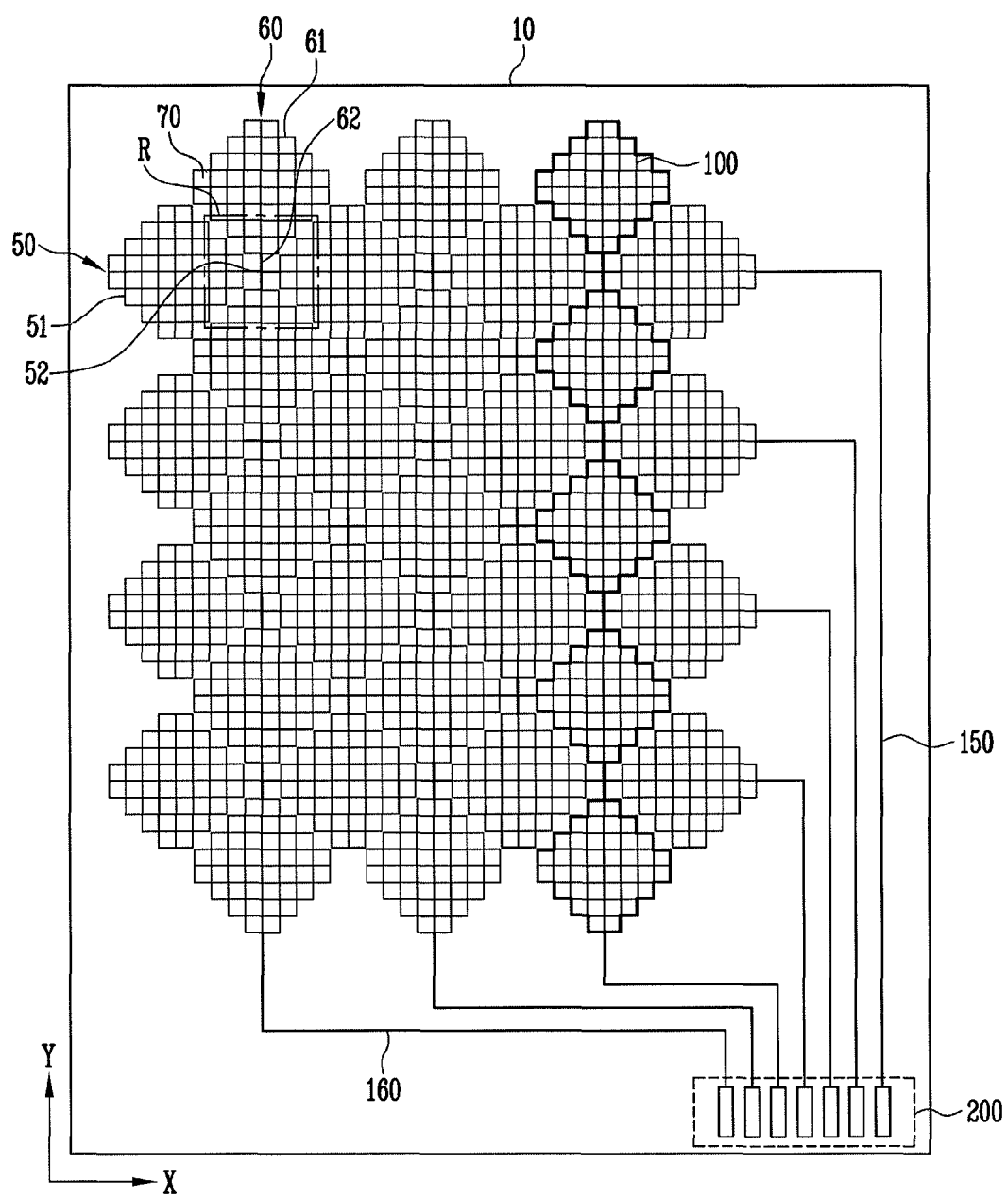
FIG. 1 illustrates a plane view of a touch screen panel according to an exemplary embodiment.

Korean Patent Application No. 10-2012-0040969, filed on Apr. 19, 2012, in the Korean Intellectual Property Office, and entitled: "Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
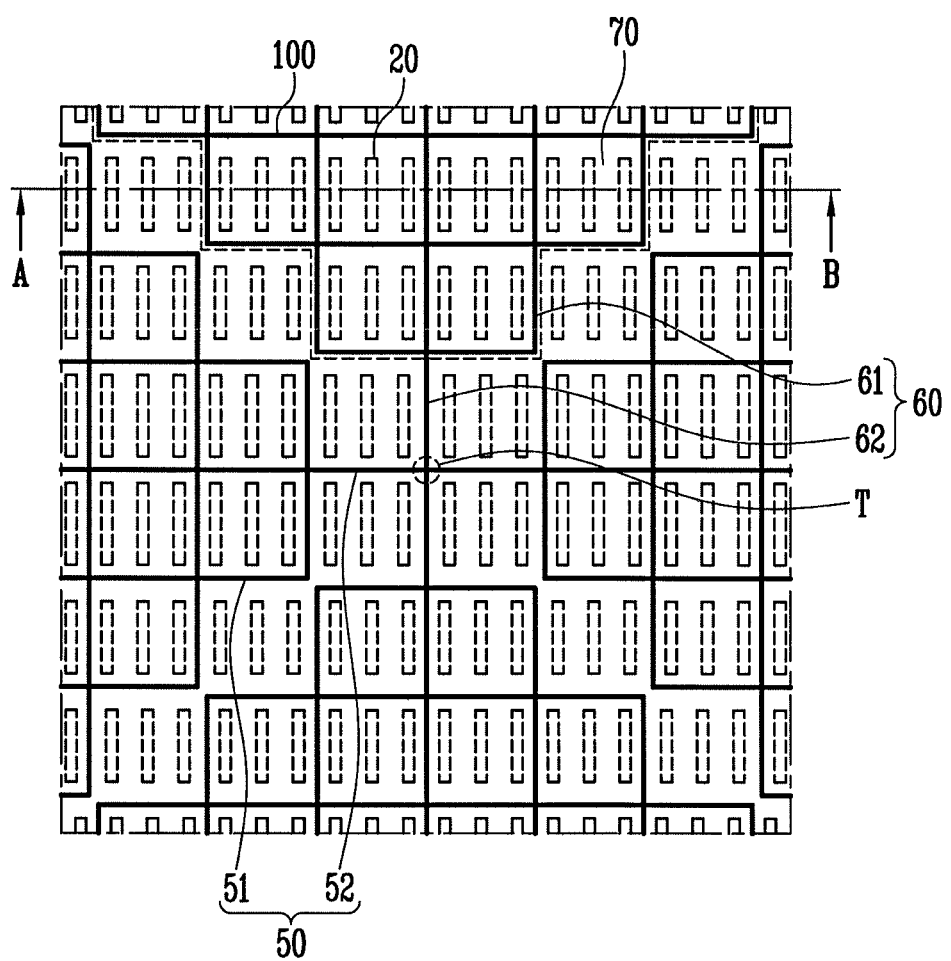
FIG. 2 illustrates an enlarged view of region R in FIG. 1.
Figure 3:
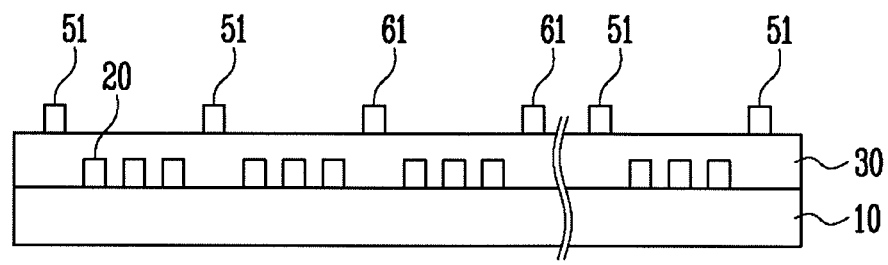
FIG. 3 illustrates a cross-sectional view along line A-B in FIG. 2.

Hereinafter, a touch screen panel according to an exemplary embodiment will be described with reference to FIGS. 1-3. FIG. 1 is a plane view of a touch screen panel according to an exemplary embodiment, FIG. 2 illustrates an enlarged view of region R in FIG. 1, and FIG. 3 illustrates a cross-sectional view along line A-B in FIG. 2.

Referring to FIG. 1, a touch screen panel according to an exemplary embodiment may include a plurality of sensing electrodes for sensing a touch by a user. For example, the sensing electrodes may include a plurality of first sensing electrodes 50 and a plurality of second sensing electrodes 60 intersecting with each other.

As shown in FIG. 1, the first sensing electrodes 50 may be formed to be long in a first direction, e.g., may extend in an X-axis direction, and may be arranged in plural in a second direction, e.g., may be spaced apart from each other in a Y-axis direction, intersecting with the first direction. The second sensing electrode 60 may be formed to be long in the second direction and may be arranged in plural in the first direction.

Conventional touch screen panels may include sensing electrodes formed of indium tin oxide (ITO). However, ITO may require a high temperature process, thereby damaging the pixels in the touch screen panel. Therefore, according to the example embodiments, the first and second sensing electrodes 50 and 60 of the touch screen panel may be formed of an opaque metal capable of being sintered at a low temperature.

For example, the opaque metal for forming the first and second sensing electrodes 50 and 60 may include a low resistance metal, e.g., at least one of Ag, Al, Cu, Cr, Ni, or the like, but is not limited thereto. Therefore, a process of manufacturing the first and second sensing electrodes 50 and 60 may be performed at a low temperature, such that damage to the pixels may be prevented or substantially minimized. In addition, as the first and second sensing electrodes 50 and 60 are formed of a metal having resistance lower than that of ITO, an RC delay may be reduced.

Further, as the opaque metal is more flexible and generates less cracks, e.g., as compared to the ITO, it may be easily applied to a flexible touch screen panel. In contrast, as the ITO has insufficient flexibility, use of ITO electrodes in a flexible touch screen panel may cause cracks therein.

As the first and second sensing electrodes 50 and 60 according to example embodiments are formed of an opaque metal, the first and second sensing electrodes 50 and 60 may be formed in a mesh structure so as to prevent blocking pixels 20 (FIG. 2). As such, blocking of light emitted from the pixel 20 by the first and second sensing electrodes 50 and 60 may be prevented or substantially minimized, thereby improving image quality and visibility.

In detail, as illustrated in FIG. 2, a plurality of pixels 20 may be arranged, e.g., in a matrix pattern, under the first and second sensing electrodes 50 and 60. Each of the first and second sensing electrodes 50 and 60 may be formed in a mesh structure, i.e., each of the first and second sensing electrodes 50 and 60 may include a plurality of intertwined metal lines 100 forming a plurality of openings 70, so as not to overlap the pixels 20. That is, the pixels 20 may be exposed through the plurality of openings 70, such that the light emitted from the pixels 20 may be transmitted outside through the openings 70 without being blocked by the metal wires 100 of the first and second sensing electrodes 50 and 60.

For example, the first and second sensing electrodes 50 and 60 may be positioned to have the metal lines 100 therein overlap non-emissive regions, i.e., regions where pixels 20 are not present, of the touch screen panel. For example, the pixels 20 may be spaced apart from each other by a predetermined distance, so the metal lines 100 configuring the mesh may be positioned to overlap the spaces, i.e., only the spaces, between the pixels 20. In this case, in order to prevent reduced visibility of the touch screen panel due to overlap between the metal lines 100 and the pixels, the metal lines 100 of the first and second sensing electrodes 50 and 60 may have a width that equals an inter-pixel distance or less.

For example, as illustrated in FIG. 2, the openings 70 in the mesh structure of the first and second sensing electrodes 50 and 60 may be arranged so one opening 70 corresponds to, e.g., exposes, three pixels 20. However, example embodiments are not limited thereto, e.g., one opening 70 may be formed to correspond to one pixel 20. Therefore, each opening 70 may correspond to at least one pixel 20. For example, when the opening 70 corresponds to three pixels 20, the three pixels 20 may be set to be a red pixel, a green pixel, and a blue pixel, respectively.

Referring FIGS. 1 and 2, the first sensing electrode 50 may include a plurality of first sensing cells 51 arranged in the first direction, i.e., along the x-axis, and first connection patterns 52 electrically connecting the first sensing cells 51 to each other. In addition, the second sensing electrode 60 may include a plurality of second sensing cells 61 arranged in the second direction, i.e., along the y-axis, and second connection patterns 62 electrically connecting the second sensing cells 61 to each other.

Here, as shown in FIGS. 1 and 2, the first sensing cell 51 and the second sensing cell 61 may have a diamond shape. For example, see diamonds in bold line in FIG. 1 illustrating second sensing cells 61 connected by second connection patterns 62 along the y-axis. However, the first sensing cell 51 and the second sensing cell 61 may also have various shapes, e.g., a circular shape, a polygonal shape, and the like, in addition to the diamond shape.

For example, each of the first sensing cell 51 and the second sensing cell 61 may be provided with a plurality of openings 70, as illustrated in FIG. 2. Further, a region between four adjacent sensing cells (see a dashed line in FIG. 2 illustrating an edge of one second sensing cell 61) may include an intersection T of the first connection pattern 52 and the second connection pattern 62 that defines additional openings 70. Although the case in which the first connection pattern 52 and the second connection pattern 62 are formed of one metal line is shown in FIGS. 1 and 2, they may also be provided with the opening 70 for exposing the pixel 20.

Referring back to FIG. 1, one end of each first sensing electrode 50 may be connected to a first position detecting line 150, and one end of each second sensing electrode 60 may be connected to a second position detecting line 160. The plurality of first position detecting lines 150 and the second position detecting lines 160 may transfer signals detected from each first and second sensing electrodes 50 and 60, respectively, to an external touch driving circuit (not shown) through a pad unit 200. The touch driving circuit receiving the signals transferred through the first position detecting line 150 and the second position detecting line 160 may recognize a position touched by the user.

Here, the first position detecting line 150 may be formed of a same material as that of the first sensing electrode 50 connected thereto, and the second position detecting line 160 may be formed of a same material as that of the second sensing electrode 60 connected thereto. Therefore, since the position detecting lines 150 and 160 may be formed by the same process as the process of forming the first and second sensing electrodes 50 and 60, a manufacturing process may be further simplified.

Figure 4:
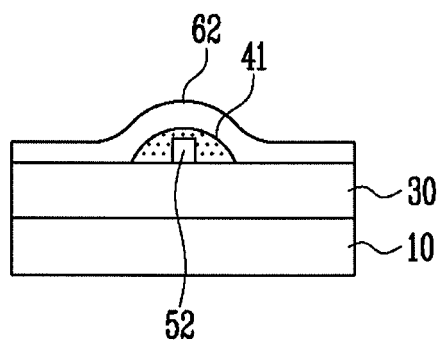
FIG. 4 illustrates a cross-sectional view of a portion at which a first sensing electrode and a second sensing electrode intersect with each other.

FIG. 3 is a cross-sectional view along line A-B of FIG. 2. FIG. 4 is a cross-sectional view of a portion at which the first sensing electrode 50 and the second sensing electrode 60 intersect with each other.

Referring FIG. 3, the touch screen panel according to an example embodiment may include a substrate 10, the plurality of pixels 20, a sealing thin film 30, and the first and second sensing electrodes 50 and 60.

The substrate 10, on which the plurality of pixels 20 are positioned, may be formed of an insulating material, e.g., glass, plastic, silicon, or a synthetic resin, or other materials, e.g., metal. In addition, the substrate 10 may be formed of a material having flexibility so as to be bent or folded, e.g., polyethyleneterephthalate (PET), polycarbonate (PC), polymethylmetharcylate (PMMA), polyethylenenaphthalate (PEN), polyethersulfone (PES), cyclic olefin copolymer (COC), triacetylcellulose (TAC), polyvinyl alcohol (PVA), polyimide (PI), polystyrene (PS), or the like.

The plurality of the pixels 20 may be arranged on the substrate 10, and each of the pixels 20 may be positioned so as not to overlap the first and second sensing electrodes 50 and 60. Therefore, light emitted from the pixels 20 is not blocked by the first and second sensing electrodes 50 and 60.

The sealing thin film 30 may be positioned on the substrate 10 and the pixels 20 in order to protect the pixels 20 positioned on the substrate 10. That is, the sealing thin film 30 may be formed at an upper side of the pixels 20, thereby making it possible to prevent penetration of moisture, oxygen, or the like, into the pixel 20. For example, the sealing thin film 30 may be formed of a transparent material having high transmissivity. In addition, the sealing thin film 30 may also be formed of a film exhibiting flexibility so as to be bent or folded.

As shown in FIG. 3, according to example embodiments, the first sensing electrode 50 and the second sensing electrode 60 may be formed on one surface of the sealing thin film 30. That is, the first and second sensing electrodes 50 and 60 may be formed on, e.g., directly on, a same surface of the sealing thin film 30.

However, when the first and second sensing electrodes 50 are on a same surface, the touch screen panel includes an insulating film 41 (FIG. 4) between the first sensing electrode 50 and the second sensing electrode 60. That is, as illustrated in FIG. 2, the first sensing electrode 50 and the second sensing electrode 60 intersect with each other at a portion T, so the insulating film 41 may be positioned on the sealing thin film 30 to insulate the first sensing electrode 50 from the second sensing electrode 60.

Since the first sensing electrode 50 and the second electrode 60 intersect at a region between the first connection pattern 52 and the second connection pattern 62, the insulating film 41 may be present between the first connection pattern 52 and the second connection pattern 62, as illustrated in FIG. 4. Here, the insulating film 41 may be partially formed, e.g., only, at the portion at which the first sensing electrode 50 and the second sensing electrode 60 intersect with each other.

Figure 5:
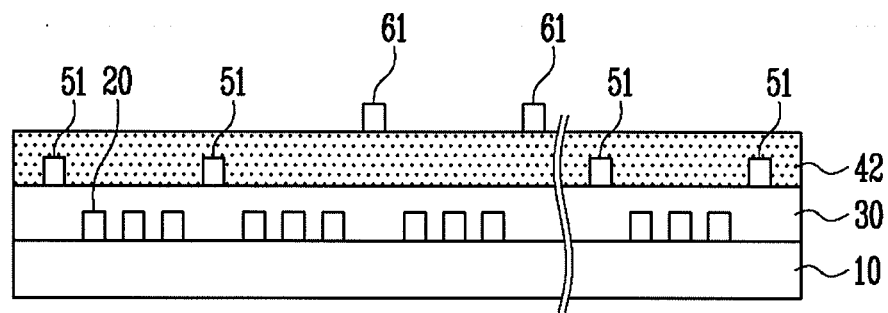
FIG. 5 illustrates a cross-sectional view of a touch screen panel according to another exemplary embodiment.

FIG. 5 is a cross-sectional view of a touch screen panel according to another exemplary embodiment. Referring to FIG. 5, the touch screen panel may include the first sensing electrode 50 and the second sensing electrode 60 on different layers, so an insulating layer 42 may be interposed between the first sensing electrodes 50 and the second sensing electrodes 60.

For example, if the first sensing electrodes 50 are positioned on, e.g., directly on, the sealing thin film 30, the insulating layer 42 may be formed between the first sensing electrode 50 and the second sensing electrode 60. Accordingly, the first sensing cell 51 and the first connection pattern 52 configuring the first sensing electrode 50 may be positioned on the sealing thin film 30, and the second sensing cell 61 and the second connection pattern 62 configuring the second sensing electrode 60 may be positioned on the insulating layer 42. That is, the insulating layer 42 may overlap the entire first sensing electrodes 50, as compared to the insulating film 41 in FIG. 4 that overlaps only part of each first sensing electrode 50.

Figure 6:
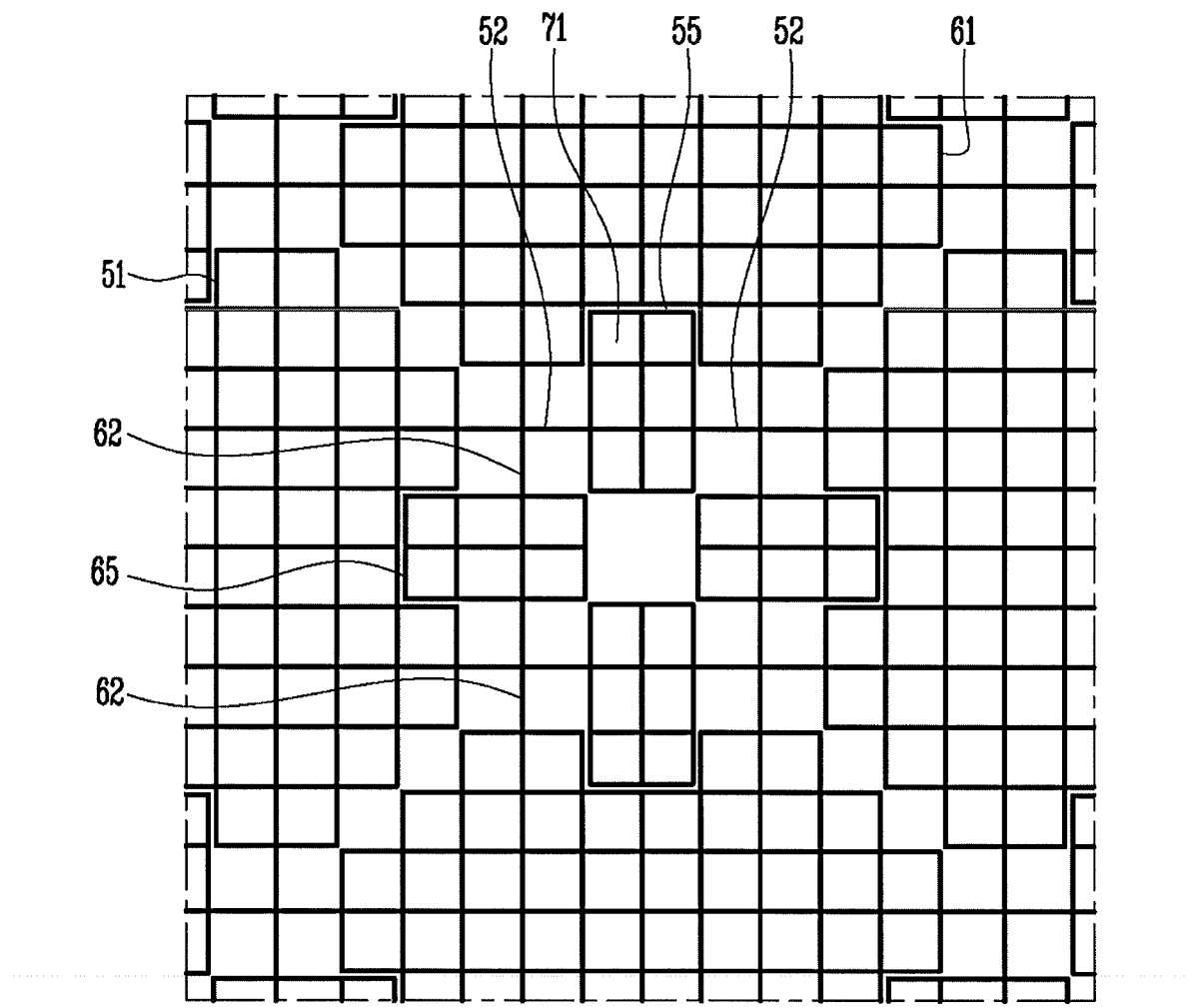
FIG. 6 illustrates an enlarged view of main components of a touch screen panel according to another exemplary embodiment.

FIG. 6 is an enlarged schematic view of a touch screen panel according to another exemplary embodiment. Referring to FIG. 6, the touch screen panel may additionally include auxiliary cells 55 and 65 in the first sensing electrodes 50 and the second sensing electrodes 60, respectively.

As shown in FIG. 2, when the first connection pattern 52 and the second connection pattern 62 are formed of metal lines, touch sensitivity at portions of the connection patterns 52 and 62 may be lowered. Therefore, according to the exemplary embodiment in FIG. 6, the auxiliary cells 55 and 66 connected to each connection pattern 52 and 62 may be provided in order to improve the touch sensitivity.

That is, the first auxiliary cell 55 may be connected to the first connection pattern 52, and the second auxiliary cell 65 may be connected to the second connection pattern 62. Here, the first auxiliary cell 55 may be positioned at a central portion of the first connection pattern 52, and the second auxiliary cell 65 may be positioned at a central portion of the second connection pattern 62.

In addition, as shown in FIG. 6, the auxiliary cell 55 may be extended toward a second sensing cell 61 adjacent thereto (see dashed line indicating an edge of the second sensing cell 61 and corresponding second patterns 62), and the second auxiliary cell 65 may be extended toward a first sensing cell 51 adjacent thereto. Here, the first auxiliary cell 55 and the second auxiliary cell 65 may have a mesh shape in which they include at least one opening 71 so as not to be overlapped with the pixel 20. For example, the opening 71 in the first auxiliary cell 55 and the second auxiliary cell 65 may be positioned so as to correspond to at least one pixel 20. In addition, the first auxiliary cell 55 may be formed integrally with the connection pattern 52 using an opaque metal, and the second auxiliary cell 65 may also be formed integrally with the second connection pattern 62 using the opaque metal.

Figure 7:
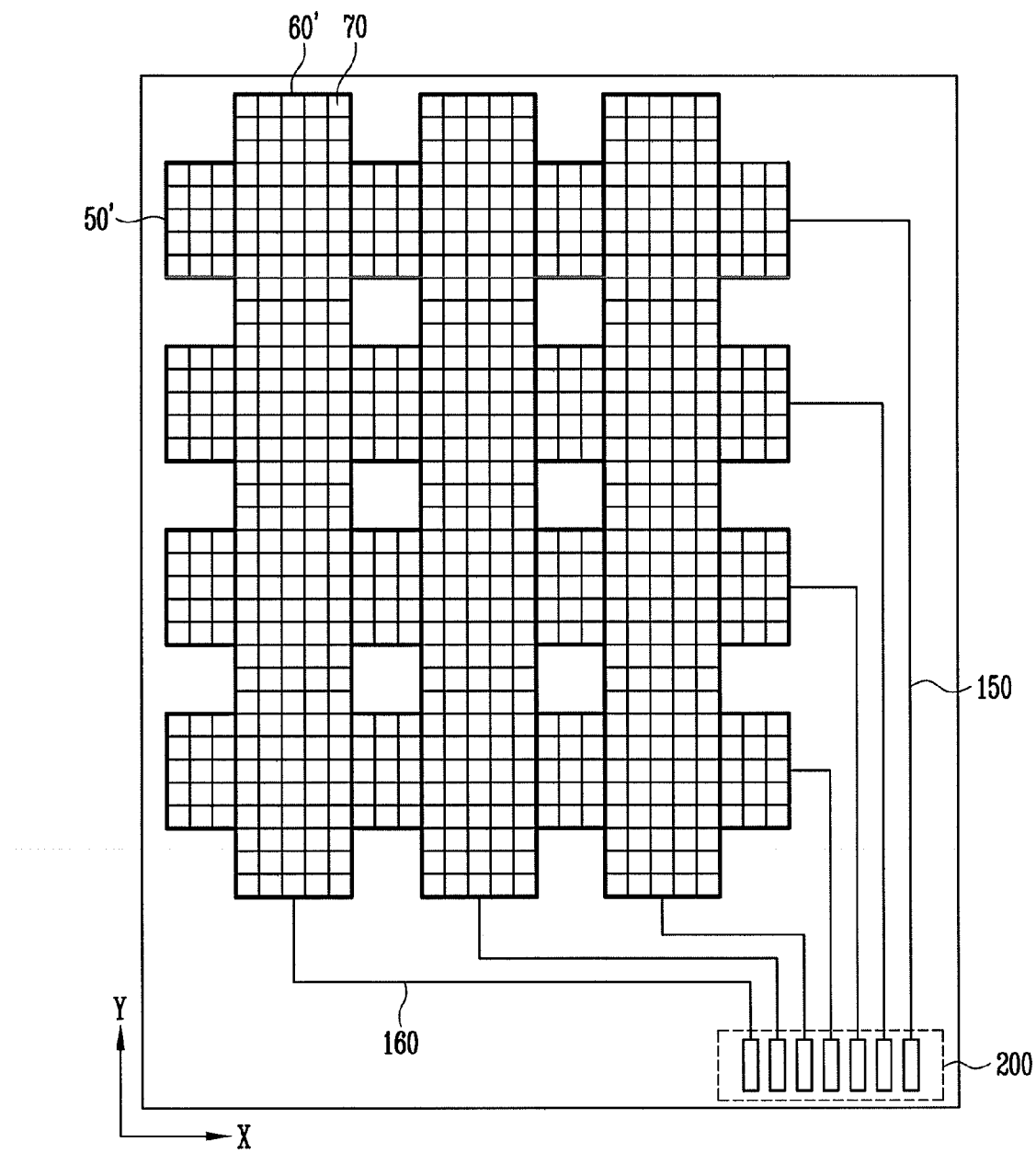
FIG. 7 illustrates a plane view of a touch screen panel according to another exemplary embodiment.

FIG. 7 is a plane view of a touch screen panel according to another exemplary embodiment. Referring to FIG. 7, first sensing electrodes 50' and second sensing electrodes 60' may be formed in a stripe shape, in which they include the plurality of openings 70 as shown. In other words, the first sensing electrodes 50' and the second electrodes 60' may have a bar-shaped mesh structure.

For example, the first sensing electrodes 50' may be linear, and each of the first sensing electrodes 50' may have a mesh structure, e.g., each of the first sensing electrodes 50' may include a plurality of intersecting metal lines defining a grid and a plurality of openings 70 arranged in a matrix pattern. Each first sensing electrode 50' may extend in the first direction and may be spaced apart from an adjacent first sensing electrode 50' in the second direction. For example, each of the first sensing electrodes 50' may be connected via a separate first position detecting line 150 to the pad unit 200. The second sensing electrodes 60' are substantially the same as the first sensing electrodes 50', with the exception of extending in the second direction, rather than the first direction.

Figure 8:
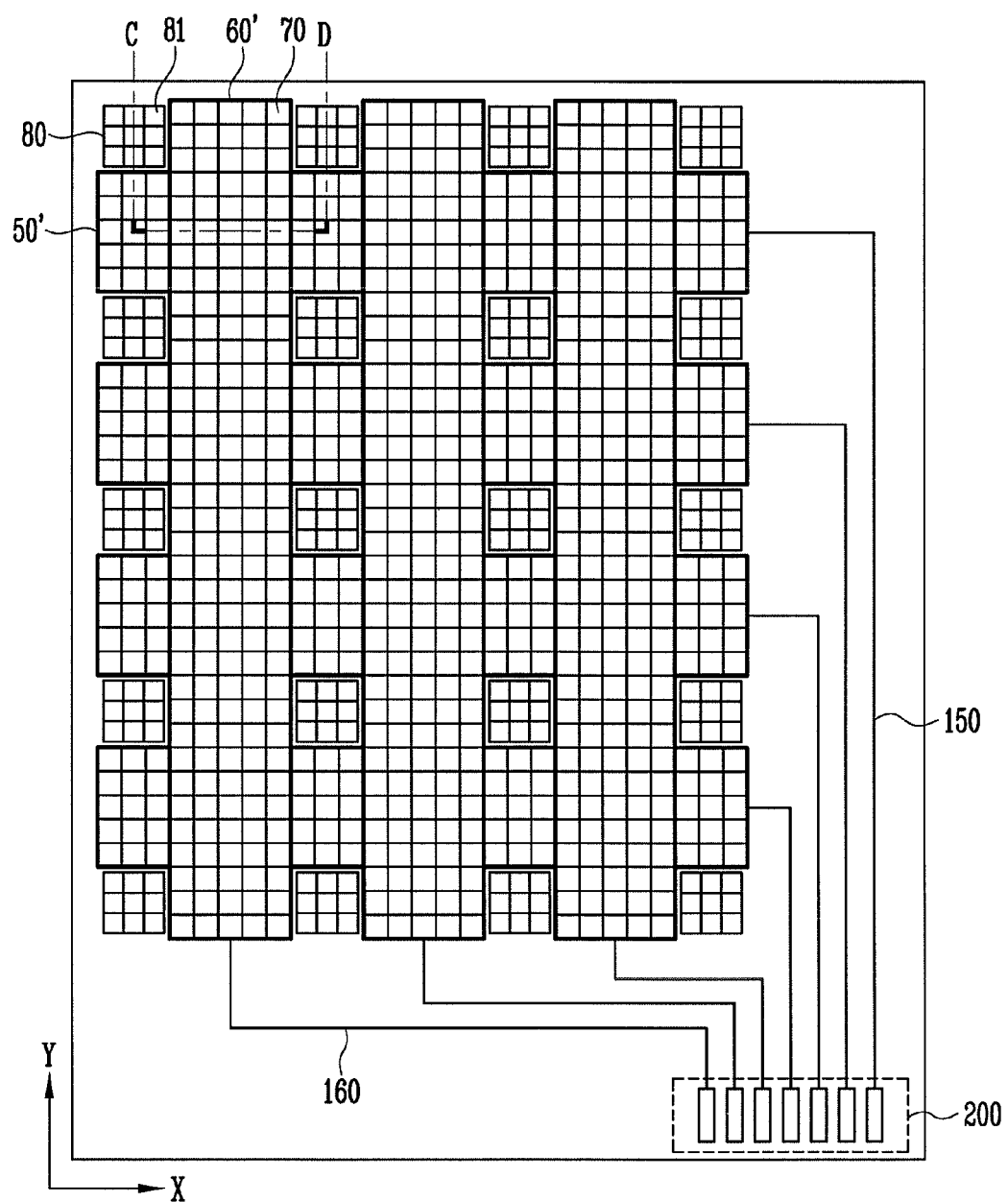
FIG. 8 illustrates a plan view of a touch screen panel according to another exemplary embodiment.
Figure 9:
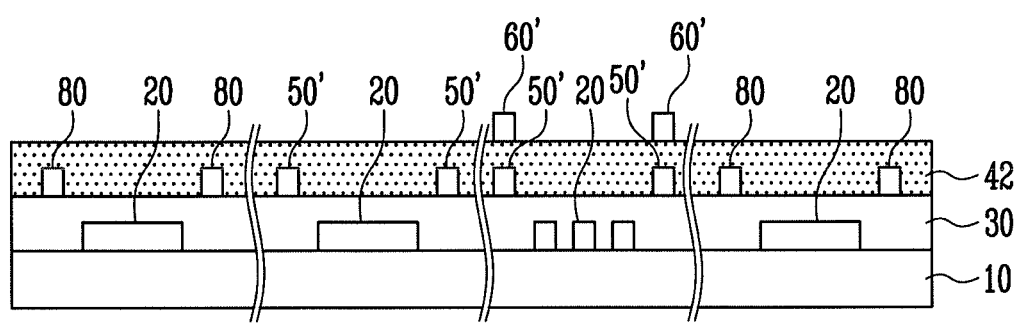
FIG. 9 illustrates a cross-sectional view along line C-D of FIG. 8.

FIG. 8 is a plane view of a touch screen panel according to another exemplary embodiment, and FIG. 9 is a cross-sectional view along line C-D of FIG. 8. It is noted that the touch screen panel in FIG. 8 is substantially the same as that in FIG. 7, with the exception of additionally including a dummy electrode.

Referring to FIG. 8, the touch screen panel may include a dummy electrode 80 disposed between the first sensing electrode 50' and the second sensing electrode 60'. For example, the first sensing electrodes 50' may be positioned on the sealing thin film 30, and the second sensing electrodes 60' may be positioned on the insulating layer 42. In another example, the second sensing electrodes 60' may be positioned on the sealing thin layer 30, and the first sensing electrodes 50' may be positioned on the insulating layer 42.

As shown in FIG. 8, in the case in which the first sensing electrodes 50' and the second sensing electrodes 60' are formed in the stripe shape, a region that does not have the first and second sensing electrodes 50' and 60' is defined. That is, the dummy electrodes 80 may be disposed between the first sensing electrodes 50' and the second sensing electrodes 60' in order to uniformly maintain the visibility. In contrast, when the dummy electrode 80 are not formed, reflectivity characteristics may be different between a region that has the sensing electrodes 50' and 60' and a region that does not have the sensing electrodes 50 and 60, thereby generating different visibility characteristics.

Here, the dummy electrode 80 may be in a state in which it is electrically floated. For example, the dummy electrode 80 may be positioned so as to be spaced apart from each of the first sensing electrodes 50' and the second sensing electrodes 60' by a predetermined distance.

In addition, the dummy electrode 80 may be made of a same material as those of the first sensing electrodes 50' and/or the second sensing electrodes 60'. That is, when the dummy electrodes 80 are formed on the same layer as a layer on which the first sensing electrodes 50' are formed, the dummy electrodes 80 may be formed of the same material as that of the first sensing electrodes 50'. Similarly, when the dummy electrodes 80 are formed on the same layer as a layer on which the second sensing electrodes 60' are formed, the dummy electrodes 80 may be formed of the same material as that of the second sensing electrodes 60'.

Therefore, the dummy electrodes 80 may also be formed of an opaque material capable of being sintered at a low temperature, and may be formed in a mesh shape including at least one opening 81 to prevent overlap with the pixels 20. For example, the opening 81 in the dummy electrode 80 may correspond to at least one pixel 20. If the opening 81 corresponds to three pixels 20, the three pixels 20 may be set to be a red pixel, a green pixel, and a blue pixel.

Referring to FIG. 9, the dummy electrode 80 and the first sensing electrode 50' may be positioned directly on the same layer, i.e., on the sealing thin film 30, and the insulating layer 42 may be entirely interposed between the first sensing electrodes 50' and the second sensing electrodes 60'. However, the dummy electrodes 80 may also be positioned on the insulating layer 42 with the second sensing electrodes 60'.

As set forth above, according to the exemplary embodiments, the sensing electrodes of the touch screen panel may be made of metal capable of being sintered at a low temperature, thereby preventing damage to the pixels during manufacturing. In addition, the sensing electrodes are formed in a mesh shape, thereby preventing overlap between the sensing electrodes and the pixels to improve visibility.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A touch screen panel, comprising:
a plurality of pixels on a substrate;
a sealing thin film on the substrate; and
a plurality of sensing electrodes on the sealing thin film, the sensing electrodes including an opaque metal, each of the sensing electrodes having a mesh structure including a plurality of intertwined metal lines defining a plurality of openings, each opening exposing at least one pixel, and the mesh structures of the sensing electrodes and the pixels overlapping different portions of the substrate,
wherein:
the sensing electrodes include:
first sensing electrodes extended in a first direction; and second sensing electrodes extended in a second direction intersecting with the first direction, the first sensing electrodes and the second sensing electrodes are formed on the sealing thin film, an insulating film being positioned between the first sensing electrodes and the second sensing electrodes at least in an intersection region between the first sensing electrodes and the second sensing electrodes, the first sensing electrodes include a plurality of first sensing cells arranged in the first direction, first connection patterns connecting the first sensing cells to each other, and a first auxiliary cell connected to the first connection pattern, the second sensing electrodes include a plurality of second sensing cells arranged in the second direction, second connection patterns connecting the second sensing cells to each other, and a second auxiliary cell connected to the second connection pattern, and each of the first auxiliary cell and the second auxiliary cell has a mesh structure including a plurality of intertwined metal lines defining a plurality of openings.

2. The touch screen panel as claimed in claim 1, wherein each of the metal lines has a width that equals an inter-pixel distance or less.

3. The touch screen panel as claimed in claim 1, wherein each opening exposes three pixels corresponding to a red pixel, a green pixel, and a blue pixel.

4. The touch screen panel as claimed in claim 1, further comprising:
a first position detecting line connected to one end of the first sensing electrode; and
a second position detecting line connected to one end of the second sensing electrode.

5. The touch screen panel as claimed in claim 4, wherein the first position detecting line and the second position detecting line include a same material as the first sensing electrodes and the second sensing electrodes, respectively.

6. The touch screen panel as claimed in claim 1, wherein the sensing electrodes are on a surface of the sealing thin film facing away from the substrate.

7. A touch screen panel, comprising:
a plurality of pixels on a substrate;
a sealing thin film on the substrate; and
a plurality of sensing electrodes on the sealing thin film, the sensing electrodes including an opaque metal, each of the sensing electrodes having a mesh structure including a plurality of intertwined metal lines defining a plurality of openings, each opening exposing at least one pixel, and the mesh structures of the sensing electrodes and the pixels overlapping different portions of the substrate, wherein the sensing electrodes include:
first sensing electrodes extended in a first direction; and
second sensing electrodes extended in a second direction intersecting with the first direction, wherein the first sensing electrodes and the second sensing electrodes are on different layers, the first sensing electrodes being on the sealing thin film, and an insulating layer being positioned between the first sensing electrodes and the second sensing electrodes, wherein each of the metal lines has a width that equals an inter-pixel distance or less, wherein the first sensing electrodes include a plurality of first sensing cells arranged in the first direction, first connection patterns connecting the first sensing cells to each other, and a first auxiliary cell connected to the first connection pattern, wherein the second sensing electrodes include a plurality of second sensing cells arranged in the second direction, second connection patterns connecting the second sensing cells to each other, and a second auxiliary cell connected to the second connection pattern, and wherein each of the first auxiliary cell and the second auxiliary cell has a mesh structure including a plurality of intertwined metal lines defining a plurality of openings.

8. The touch screen panel as claimed in claim 7, wherein the first sensing cells and the second sensing cells have a diamond shape.

9. The touch screen panel as claimed in claim 7, wherein the first auxiliary cell is on a central portion of the first connection pattern, and the second auxiliary cell is on a central portion of the second connection pattern.

10. The touch screen panel as claimed in claim 9, wherein the first auxiliary cell extends toward a second sensing cell adjacent thereto, and the second auxiliary cell extends toward a first sensing cell adjacent thereto.

11. The touch screen panel as claimed in claim 7, wherein the opening in each of the first auxiliary cell and the second auxiliary cell exposes at least one pixel.

12. The touch screen panel as claimed in claim 7, wherein the first connection pattern and the second connection pattern intersect each other, an insulating film being interposed therebetween.

* * * * *